US006826046B1

(12) United States Patent
Muncaster et al.

(10) Patent No.: US 6,826,046 B1
(45) Date of Patent: Nov. 30, 2004

(54) DISK DRIVE UNIT

(75) Inventors: Timothy J. Muncaster, Ryde (GB); William A. Saville, Wickham (GB)

(73) Assignee: Xyratex Technology Limited, Hampshire (GB)

( * ) Notice: Subject to any disclaimer, the term of this patent is extended or adjusted under 35 U.S.C. 154(b) by 100 days.

(21) Appl. No.: 10/148,331

(22) PCT Filed: Nov. 23, 2000

(86) PCT No.: PCT/GB00/04466

§ 371 (c)(1),
(2), (4) Date: Sep. 20, 2002

(87) PCT Pub. No.: WO01/41148

PCT Pub. Date: Jun. 7, 2001

(30) Foreign Application Priority Data

Nov. 29, 1999 (GB) .............................. 9928211

(51) Int. Cl.[7] ................................................ G06F 1/20
(52) U.S. Cl. ...................... 361/687; 361/697; 474/184; 324/73.1
(58) Field of Search ................................ 361/685, 687, 361/695, 697; 474/57, 184; 324/73.1, 158.1

(56) References Cited

U.S. PATENT DOCUMENTS

| 4,685,303 A | * | 8/1987 | Branc et al. ................. 361/687 |
| 4,888,549 A | * | 12/1989 | Wilson et al. ............. 324/73.1 |
| 4,967,155 A | | 10/1990 | Magnuson |
| 5,263,537 A | | 11/1993 | Plucinski et al. |
| 5,414,591 A | | 5/1995 | Kimura et al. |
| 5,484,012 A | | 1/1996 | Hiratsuka |
| 5,851,143 A | | 12/1998 | Hamid |
| 5,859,409 A | * | 1/1999 | Kim et al. ................... 219/400 |
| 6,327,150 B1 | * | 12/2001 | Levy et al. .................. 361/724 |
| 6,473,301 B1 | * | 10/2002 | Levy et al. .................. 361/685 |
| 6,526,841 B1 | * | 3/2003 | Wanek et al. .............. 73/865.6 |

FOREIGN PATENT DOCUMENTS

| EP | 0 210 497 | 2/1987 |
| EP | 0 356 977 | 3/1990 |
| EP | 0 776 009 | 5/1997 |
| GB | 2 312 984 | 11/1997 |

* cited by examiner

*Primary Examiner*—Lisa Lea-Edmonds
(74) *Attorney, Agent, or Firm*—Pillsbury Winthrop LLP (57) ABSTRACT

A disk drive unit carrier (1) is adapted to carry a single disk drive unit (2). The carrier (1) includes a temperature control device (4) for controlling the temperature of the disk drive unit (2). The temperature control device (4) is preferably in the form of an air flow control device (5,6) for controlling the flow of air across the disk drive unit (2) appropriately according to the required temperature for the disk drive unit (2).

24 Claims, 5 Drawing Sheets

DISK DRIVE UNIT

This application is the National Phase of International Application PCT/GB00/04466 filed 23 Nov. 2000, which designated the U.S.

The present invention relates to a disk drive unit carrier, disk drive test apparatus, data storage apparatus, a method of testing a plurality of disk drive units, and a method of operating a plurality of disk drive units.

During manufacture of disk drive units, it is necessary to test the disk drive units to ensure that they meet the required specification. As part of the testing operation, it is necessary to control the temperature of the disk drive units. The temperature of the disk drive units is varied across a wide range during testing. In one of the applicant's own known testing apparatus, the temperature of plural disk drive units is controlled by using cooling or heating air which is common to all of the disk drive units.

It is also desirable to maintain the temperature of a disk drive unit to be within a predetermined range during normal operation of the disk drive unit, i.e. when the disk drive unit is in normal use by an end user. It is common practice in computers to provide a cooling fan which draws in air and causes the cooling air to flow over components within the computer including particularly the CPU, in order to keep down the temperature of the components. However, this provides a crude cooling mechanism and does not provide for separate control of the temperature of the individual components of the computer and particularly the disk drive unit.

According to a first aspect of the present invention, there is provided a disk drive unit carrier for receiving a disk drive unit, the carrier being adapted to carry a single disk drive unit and comprising a temperature control device for controlling the temperature of a disk drive unit received in the carrier to be at a predetermined temperature during operation of the disk drive unit.

The carrier enables the temperature of a disk drive unit in the carrier to be controlled to be at a predetermined temperature during operation of the disk drive unit. It will be understood that, in practice, the temperature will be controlled to be within certain limits of a predetermined temperature and the phrase "predetermined temperature" shall be construed accordingly. If the disk drive unit carrier is used to receive a disk drive unit during testing of the disk drive unit as part of the manufacturing process, as will be discussed further below the carrier can be located with other similar carriers each carrying their own respective disk drive units. In that case, the present invention allows the temperature of individual disk drive units to be controlled independently. This in turn means that different disk drive units can be at different temperatures at the same time, which is advantageous in that it allows for fully independent testing of the disk drive units including insertion and removal of the disk drive units into respective carriers. Moreover, the various disk drive units can be supplied with power at different levels, which in the prior art apparatus would inevitably mean that the different disk drive units would normally be at different temperatures; in contrast, with carriers of the present invention, the temperatures of disk drive units operating at different power levels can be maintained to be the same if desired.

The temperature control device in a preferred embodiment comprises an air flow control device for causing air to flow across a disk drive unit received in the carrier. As will be discussed further below, the air can be for cooling or warming the disk drive unit and/or for keeping the temperature of the disk drive unit constant.

The carrier may comprise a heat exchanger for selectively receiving and cooling at least a portion of the air that has passed over a disk drive unit received in the carrier thereby to provide chilled air, the air flow control device being selectively operable to cause air to recirculate directly across a disk drive unit received in the carrier, or to cause at least a portion of the air that has passed over a disk drive unit received in the carrier to pass through the heat exchanger to provide chilled air and to cause said chilled air to flow across a disk drive unit received in the carrier, or to cause a mixture of directly recirculated air and chilled air to flow across a disk drive unit received in the carrier.

The air flow control device may be selectively operable to cause air to recirculate across a disk drive unit received in the carrier, or to cause fresh air from outside the carrier to flow across a disk drive unit received in the carrier, or to cause a mixture of recirculated air and fresh air from outside the carrier to flow across a disk drive unit received in the carrier.

Typically, causing air to recirculate across a disk drive unit will cause the temperature of the disk drive unit to rise until heat loss from the carrier matches the power consumption of the disk drive unit. Fresh air will normally be at a temperature which is lower than the temperature of the disk drive unit and thus will tend to cool the disk drive unit. Otherwise, a heat exchanger can be used to provide chilled air. The air flow means can be operated to cause a mixture of recirculated air and fresh or chilled air to flow across the disk drive unit, allowing for intermediate temperatures to be obtained and maintained.

In a preferred embodiment, the air flow control device comprises a baffle which is selectively movable.

A servo control may be provided for controlling movement of the baffle.

The carrier may comprise a selectively operable heater in the air flow path to a disk drive unit received in the carrier for selectively heating air prior to said air flowing across a disk drive unit received in the carrier. This allows the temperature of the disk drive unit to be raised or to be raised more quickly than otherwise.

In one embodiment, the disk drive unit carrier is a disk drive unit test carrier for receiving a disk drive unit during testing of the disk drive unit.

In accordance with a second aspect of the present invention, there is provided disk drive unit test apparatus for receiving a plurality of disk drive units, the test apparatus comprising a plurality of carriers as described above each for receiving a respective disk drive unit to allow the temperature of the respective disk drive units to be independently controlled during testing of the disk drive units.

As mentioned briefly above, such test apparatus allows plural disk drive units to be tested independently of each other as part of the manufacturing process, with independent control of the temperature of each of the disk drive units being possible. This provides a flexibility during testing that has not previously been available.

According to another aspect of the present invention, there is provided data storage apparatus, the apparatus comprising a plurality of carriers as described above each for receiving a respective disk drive unit to allow the temperature of the respective disk drive units to be independently controlled during operation of the disk drive units.

Having independent control of the temperature of plural disk drive units in data storage apparatus provides effectively complete control over the temperature of the individual disk drive units in use in the data storage apparatus. This in turn means that the disk drive units are each likely to be performing within a specified safe temperature range, which makes the performance of the data storage apparatus as a whole more reliable. In contrast, in the prior art where there is only a single temperature control which is common to all of the plural disk drive units, the temperature of an individual disk drive unit can deviate outside the safe temperature range; as well as making that individual disk drive unit less reliable or even likely to fail, this also means that the temperature of the other disk drive units can be affected. These problems are overcome with data storage apparatus according to the present invention.

Each of the apparatus described above may comprise a controller for independent control of the temperature control devices of the disk drive unit carriers.

According to another aspect of the present invention, there is provided a method of testing a plurality of disk drive units, wherein the temperature of each of the disk drive units is independently controlled during testing of the disk drive units.

In a preferred embodiment, the method comprises the step of controlling a flow of air across each of the disk drive units independently thereby to independently control the temperature of each of the disk drive units.

The method may comprise the step of, independently for each disk drive unit, controlling the flow of air across the disk drive unit to cause air to recirculate directly across the disk drive unit, or to cause chilled air obtained by passing at least a portion of the air that has passed over the disk drive unit through a heat exchanger to flow across the disk drive unit, or to cause a mixture of directly recirculating air and chilled air to flow across the disk drive unit.

The method may comprise the step of, independently for each disk drive unit, controlling the flow of air across the disk drive unit to cause air to recirculate across the disk drive unit, or to cause fresh air to flow across the is disk drive unit, or to cause a mixture of recirculated air and fresh air to flow across the disk drive unit.

According to yet another aspect of the present invention, there is provided a method of operating a plurality of disk drive units, wherein the temperature of each of the disk drive units is independently controlled during operation of the disk drive units.

Preferably, the method comprises the step of controlling a flow of air across each of the disk drive units independently thereby to independently control the temperature of each of the disk drive units.

In an embodiment, the method may comprise the step of, independently for each disk drive unit, controlling the flow of air across the disk drive unit to cause air to recirculate directly across the disk drive unit, or to cause chilled air obtained by passing at least a portion of the air that has passed over the disk drive unit through a heat exchanger to flow across the disk drive unit, or to cause a mixture of directly recirculating air and chilled air to flow across the disk drive unit.

In another embodiment, the method comprises the step of, independently for each disk drive unit, controlling the flow of air across the disk drive unit to cause air to recirculate across the disk drive unit, or to cause fresh air to flow across the disk drive unit, or to cause a mixture of recirculated air and fresh air to flow across the disk drive unit.

An embodiment of the present invention will now be described by way of example with reference to the accompanying drawings, in which.

Figure 1:
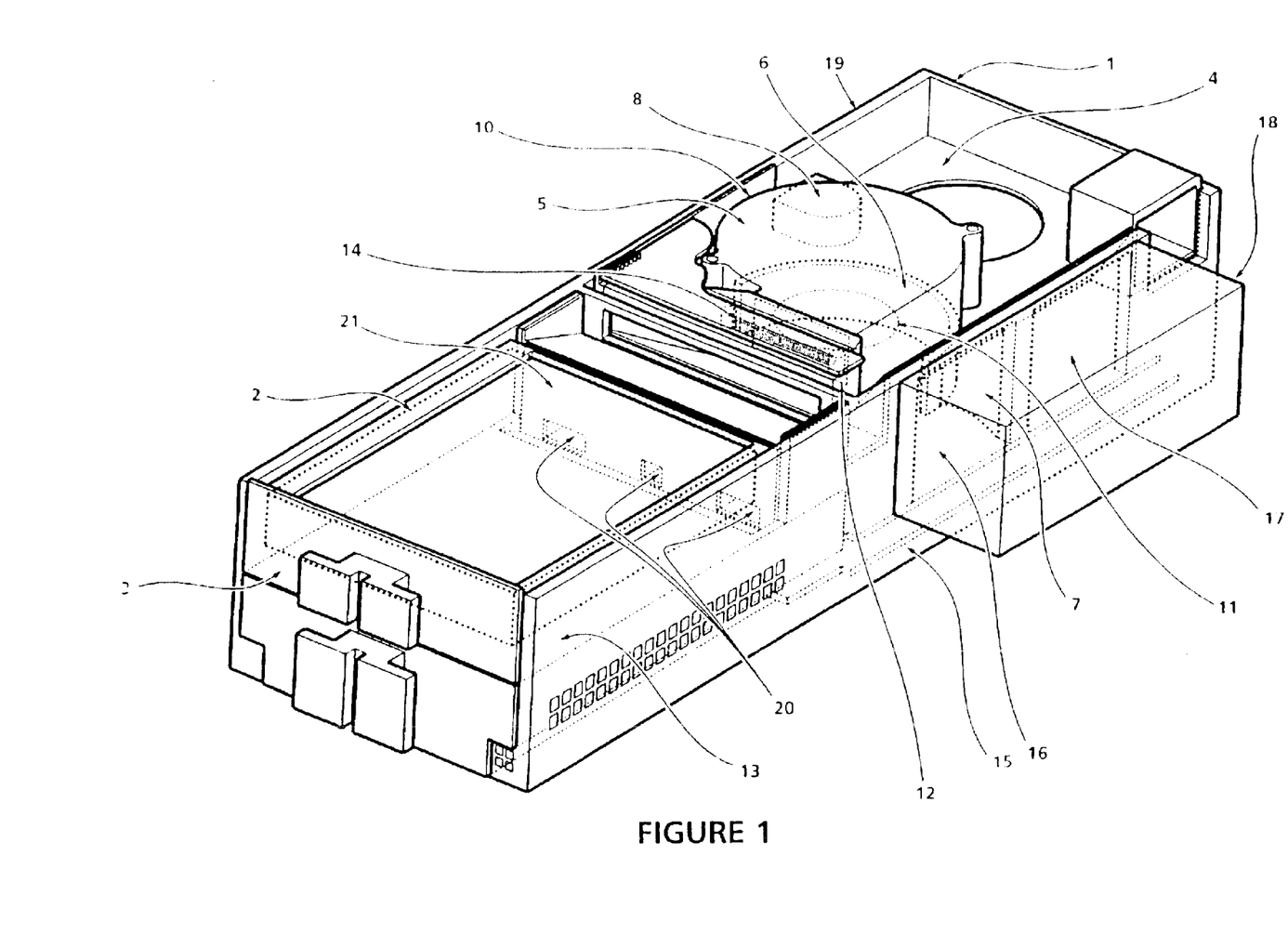
FIG. 1 is a perspective view, partly in phantom and with parts removed for clarity, of an example of a carrier for a disk drive unit in accordance with an aspect of the present invention.

In FIG. 1, there is shown a perspective view, partly in phantom, of an example of a disk drive unit carrier 1 according to the present invention. The carrier 1 is of box-like construction generally of rectangular section. A disk drive unit 2 is received in a front portion of the carrier 1. The carrier 1 has a door 3 at the front which can be opened or removed to allow a disk drive unit 2 to be inserted into or removed from the carrier 1. The disk drive unit 2 will typically be a complete unit having one or more rotatable magnetic disks on which data can be stored, one or more read/write heads mounted on one or more read/write arms, at least one motor for moving the arm or arms, and appropriate internal electrical connections. Electrical connections for supply of power and control signals to and from the disk drive unit 2 are provided but are not shown in the drawings for reasons of clarity.

The rear of the carrier 1 includes a temperature control device 4 for controlling the temperature of the disk drive unit 2 to be at a predetermined temperature during operation of the disk drive unit 2. "Operation" of the disk drive unit 2 includes operation during testing of the disk drive unit 2 and also operation of the disk drive unit 2 during normal use by an end user. A dividing wall 21 is provided between the front and the rear of the carrier 1, the dividing wall 21 having through openings 20 at its lowermost edge and not extending quite to full height in the carrier 1.

Figure 4:
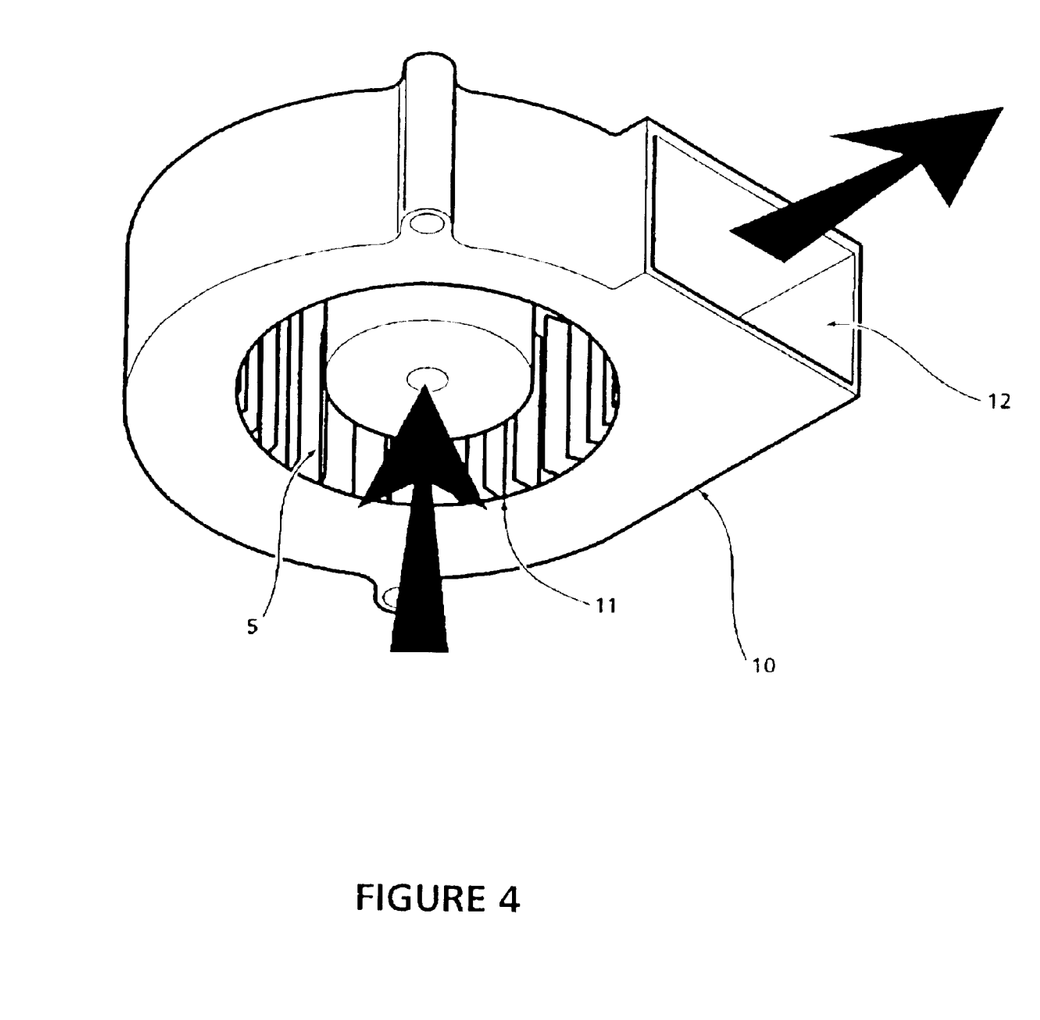
FIG. 4 is a perspective view of a fan suitable for the carrier of FIGS. 1 to 3; and, FIG. 5 is a perspective view, partly in phantom, of a second example of a carrier for a disk drive unit in accordance with an aspect of the present invention.

In the example shown, the temperature control device 4 includes a centrifugal fan 5 which rotates about a vertical axis in the orientation shown in the drawings and a baffle 6 for directing flow of air appropriately. The baffle 6 is in the form of an upstanding semi-circular wall which can be pivoted about a vertical axis by a motor 8. The centrifugal fan 5, which is also shown in FIG. 4, is contained within a generally circular housing 10 which directs the air flow exiting the fan 5 towards the disk drive unit 2. The housing 10 has an air inlet 11 to the fan 5 at the centre of its lower side and a generally tangential air outlet 12 at its upper side and directed towards the disk drive unit 2.

Two portions of a side wall 15 of the carrier 1 are absent towards the rear of the carrier 1 to provide two adjacent openings 16,17 in the side wall 15 at a position near the fan 5. The side wall is has a short wall portion 7 between the openings 16,17 which is directed generally inwardly of the carrier 1 towards the fan S. A heat exchanger 18 is fixed to the carrier 1 over the openings 16,17 in the side wall 15 so that air exiting the carrier 1 through the front opening 16 passes through the heat exchanger 18, where the air is cooled, and back into the carrier 1 via the rear opening 17.

Figure 2:
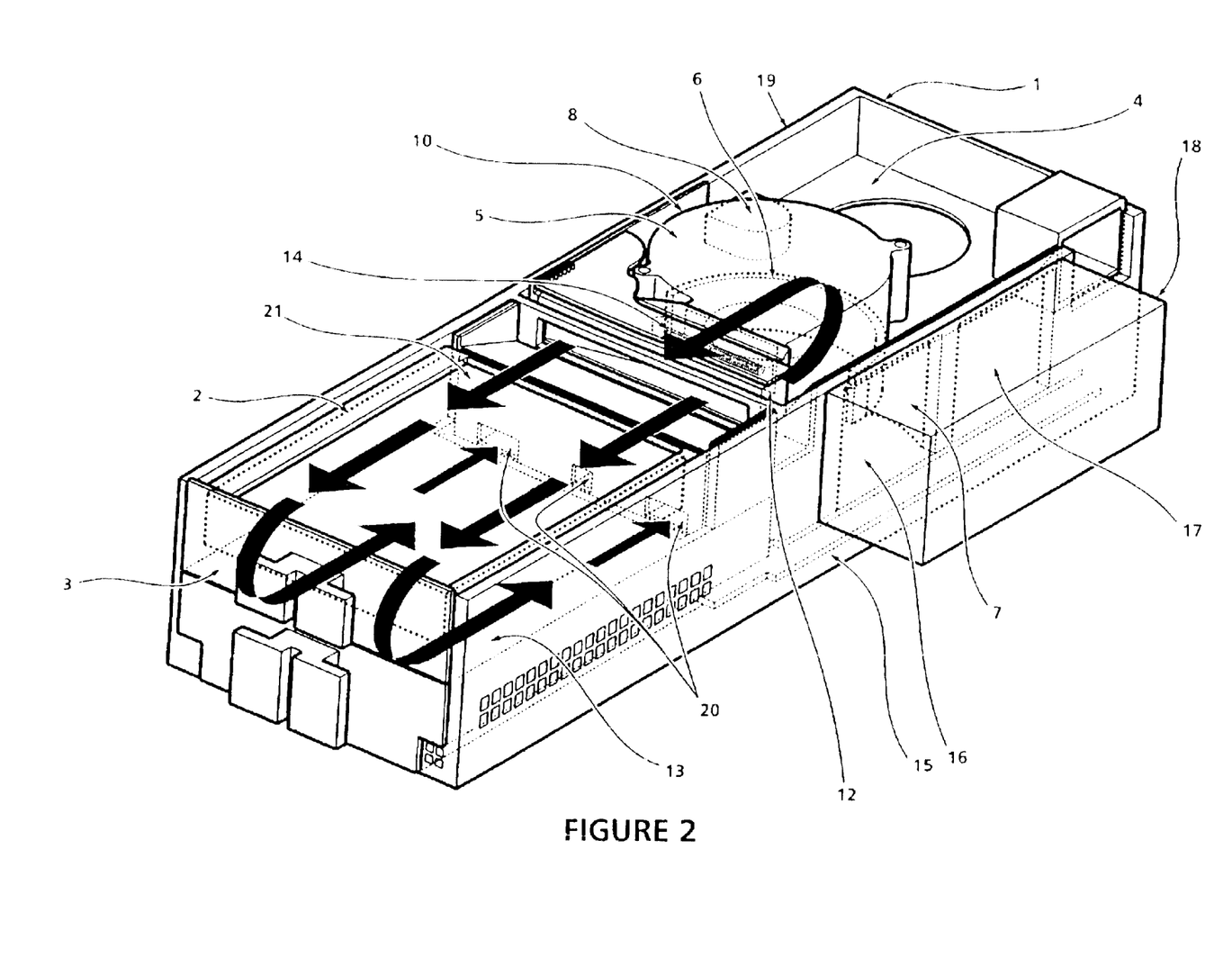
FIG. 2 is a perspective view of the carrier of FIG. 1, partly in phantom and with parts removed for clarity, in air recirculation mode.

Referring now to FIG. 2, which shows the temperature control device 4 configured to cause air simply to be recirculated around the disk drive unit 2, it will be seen that the semi-circular baffle 6 has been rotated by the baffle motor 8 to span the gap between the inwardly facing wall portion 7 and the opposite side wall 19 of the carrier 1 and to be in a position to close off the air intake path to the inlet 11 to the fan 5 from the rear opening 17 in the side wall 15.

The rotating centrifugal fan 5 thus forces air out of the outlet 12 of the fan housing 10 over the top of the dividing wall 21 and over the top of the disk drive unit 2 towards the front of the carrier 1. The door 3 of the carrier 1 then directs the air across the front of the disk drive unit 2. The air is then directed by the floor 13 of the carrier 1 under the disk drive unit 2 back through the openings 20 in the dividing wall 21 between the disk drive unit 2 and the temperature control device 4, and directly towards the inlet 11 of the fan housing 10 to the fan S. Air is then drawn up again by the fan 5 to pass back over the top of the disk drive unit 2. Air cannot exhaust through the front opening 16 because the closed rear opening 17 prevents air passing through the heat exchanger 18.

Figure 3:
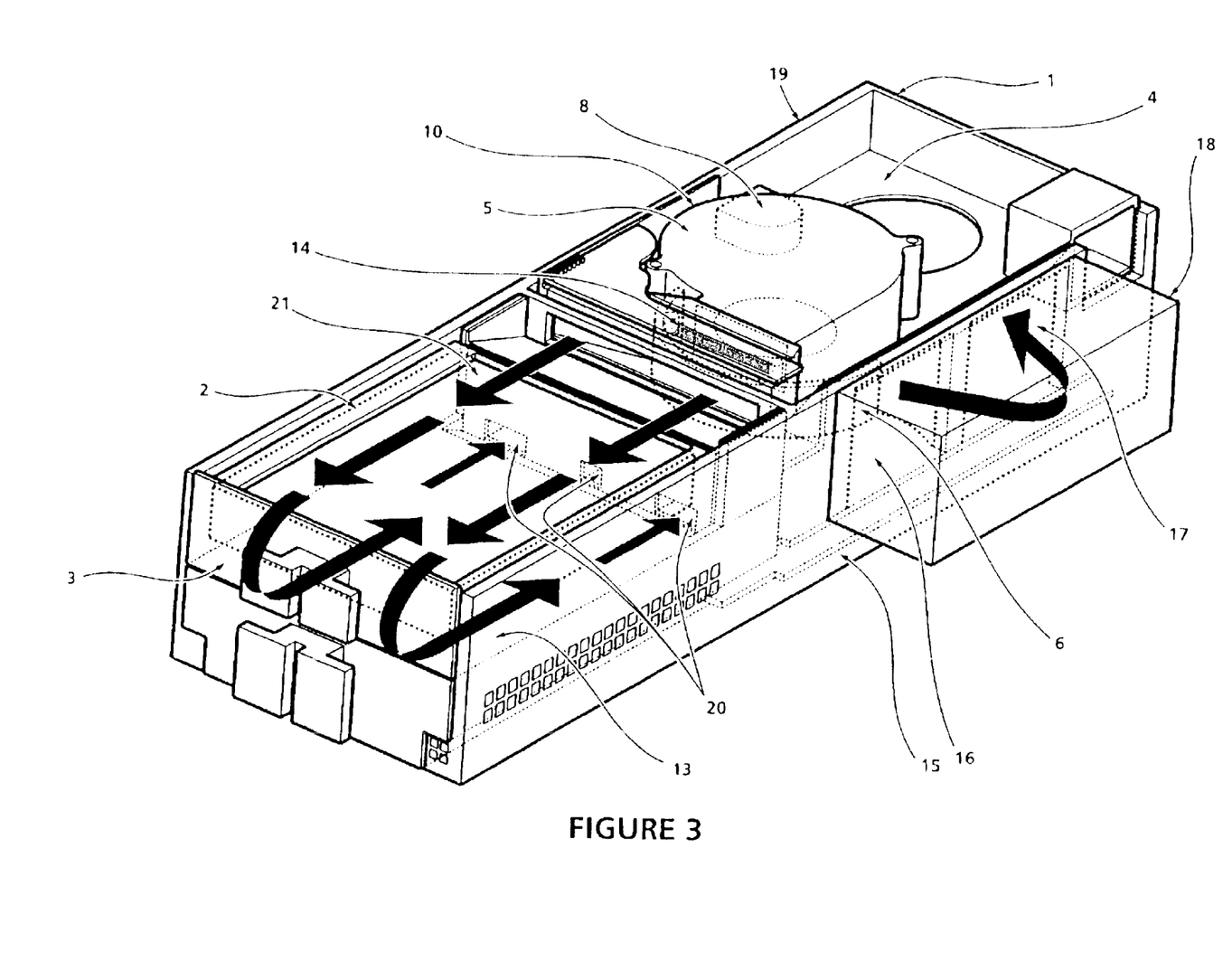
FIG. 3 is a perspective view of the carrier of FIGS. 1 and 2, partly in phantom and with parts removed for clarity, in chilled air mode.

Referring now to FIG. 3, the temperature control device 4 is shown in an air chill configuration. In this configuration, the baffle motor 8 has rotated the baffle 6 through 180° around the fan housing 10 in order to expose the fan inlet 11 to the air intake path from the rear opening 17 in the side wall 15 of the carrier 1. In this configuration, air that has passed over and under the disk drive unit 2 and through the openings 20 is directed by the baffle 6 through the front opening 16 in the side wall 15 to be chilled by being drawn through the heat exchanger 18 by the fan 5. The chilled air then passes in through the rear opening 17 in the side wall 15 and into the fan 5 to again be forced to flow over the top, down the front, and under the disk drive unit 2. As will be understood, in this configuration, the baffle 6 prevents the air that flows out from under the disk drive unit 2 from passing directly back to the fan inlet 11. On the contrary, in this configuration, the air flow exiting from under the disk drive unit 2 is directed towards the front opening 16 in the side wall 15 and through the heat exchanger 18 to the rear opening 17 in the side wall 15.

As will be appreciated, when air is caused simply to recirculate around the disk drive unit 2 as in the configuration shown in FIG. 2, the temperature of the disk drive unit 2 will rise until the heat loss through the carrier 1 substantially matches the power consumption of the disk drive unit 2. This provides for rapid heating of the disk drive unit 2. This is particularly advantageous when testing of the disk drive unit 2 at higher temperatures is required as it allows those higher temperatures to be achieved more quickly, allowing for a fast throughput of disk drive units 2 during testing. In the preferred embodiment shown in the drawings, an electrical heater 14 is provided in the air flow path from the outlet 12 to the disk drive unit 2 to be selectively operated to heat the air, thereby to achieve more rapid warming of the disk drive unit 2 if required.

When the carrier 1 is operating in the chilled air mode shown in FIG. 3, chilled air is caused to flow over the disk drive unit 2, thereby allowing the disk drive unit 2 to be cooled as necessary. Use of chilled air allows more rapid cooling of the disk drive unit 2 to be achieved.

By appropriate positioning of the baffle 6 between the extreme positions shown in FIGS. 2 and 3, a mix of chilled air and directly recirculated air can be caused to flow across the disk drive unit 2, the mix being in any desired proportion. The baffle 6 can therefore be positioned to achieve and maintain the temperature of the disk drive unit 2 at a predetermined level.

Figure 5:
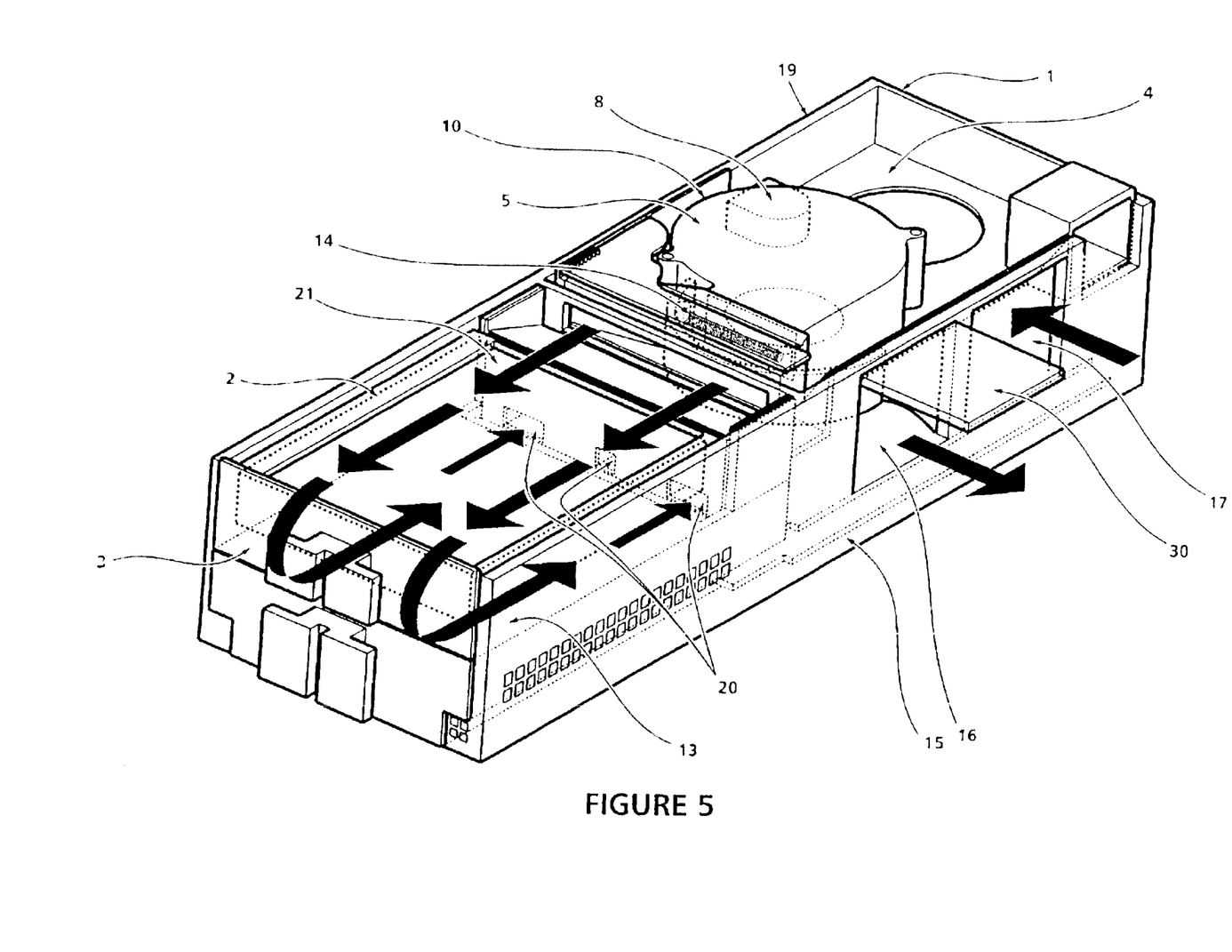

A second example of a carrier 1 according to the present invention is shown in FIG. 5. In the drawing and description of this second example, the same reference numerals are used to denote the same or corresponding parts as in the first example of the carrier 1 described above and a detailed description of the common parts will not be given here. The second example of the carrier 1 differs from the first example in that no heat exchanger 18 is provided over the front and rear openings 16,17 in the side wall 15 of the carrier 1. On the contrary, in the second example, a flap 30 is hingedly fixed over the front opening 16. The flap 30 can be operated by a motor (not shown) or can simply be freely hinged to open the front opening 16, so as to allow air that has passed over the disk drive unit 2 to exhaust out of the carrier 1, or to close the front opening 16 to cause air to be recirculated directly back to the fan 5. The rear opening 17 is simply a fresh air intake through which fresh air can selectively pass into the carrier 1 from outside.

Thus, for operation of the second example in the fresh air mode, the baffle 6 is moved to open the rear opening 17 to allow fresh air to enter the carrier 1, it being understood that fresh air from outside the carrier 1 is typically much cooler than the operating disk drive unit 2. At the same time, the flap 30 over the front opening 16 is opened to allow warmed air that has passed over the disk drive unit 2 to pass out of the carrier 1. In the air recirculation mode, the baffle 6 is moved to close the rear opening 17 and the flap 30 is moved to close the front opening 16 so that air that has passed over the disk drive unit 2 passes directly back to the fan 5. A mix of circulated and fresh air can be caused to pass over the disk drive unit 2 by appropriate positioning of the baffle 6 and the flap 30.

In either example described above, operation of the baffle motor 8 can be under servo control. Control of movement of the baffle 6 and the flap 30 (if provided) and operation of the heater 14 can be made under appropriate software running on a suitable computer. One or more temperature sensors may be provided to monitor the temperature of the disk drive unit 2 and to provide one or more control signals to the servo control.

It will be appreciated that the air flow arrangements shown in the drawings are examples only and that alternative arrangements for air flow over the disk drive unit 2 are possible. For example, air could be caused to flow in the same direction over the top of and under the disk drive unit 2 and can be returned to the fan 5 along one or both long sides of the disk drive unit 2. This arrangement may be advantageous where cables are connected to the rear of the disk drive unit 2 as such cables may otherwise affect the air flow characteristics, though it may result in the carrier 1 being slightly wider than otherwise thereby requiring additional space for location of the carrier 1.

Each of the carriers 1 described above can be used to control the temperature of a disk drive unit 2 during testing of the disk drive unit 2 as part of the normal manufacturing process of the disk drive unit 2. Each of the carriers 2 can also be used to control the temperature of the disk drive unit 2 during normal operation of the disk drive unit 2 by an end user.

A plurality of carriers 1 can be incorporated in or assembled into disk drive unit test apparatus, such as for example a test rack. In this way, plural disk drive units can be tested independently of each other, with independent control of the temperature of each of the disk drive units 2 taking place. This allows individual disk drive units 2 to be moved into and out of the test apparatus without affecting the testing of other disk drive units 2 in the apparatus, a feature which has not been available previously. The temperature of individual disk drive units 2 in the test apparatus can be markedly different from the temperature of other disk drive units 2 in the apparatus. The temperature of each of the disk drive units 2 can be controlled to be at a predetermined level, which may or may not be the same for all of the disk drive units 2, regardless of the power consumption of the individual disk drive units 2.

In addition to use in controlling the temperature of disk drive units 2 during testing, each of the carriers 1 described above can be used to control the temperature of a disk drive unit 2 when used by an end user as a data storage product. Similarly, plural carriers 1 can be incorporated in or assembled together to form data storage apparatus having plural disk drive units, which may be independently operable, the temperature of each of which can be independently controlled. By making the individual disk drive units 2 in such data storage apparatus completely independent of each other, operation of the disk drive units 2 in the data storage apparatus can be effectively completely unaffected when individual disk drive units 2 are removed for maintenance or replacement, for example, or if one of the disk drive units 2 overheats or fails to operate for some reason.

The carriers 1 can be simply mass manufactured at relatively low cost. The carrier 1 is effectively modular in that multiple carriers 1 can be built up together without affecting the operation of other carriers 1.

In a particular example, the temperature of the disk drive unit 2 can be controlled to be within ±1° C. of the target temperature in the range of ambient +3° C. to 70° C. The maximum rate of increase of temperature which is achievable can be of the order of +6° C. per minute and the maximum rate of lowering of temperature can be of the order of 2° C. per minute.

It is preferred that the air flow over the disk drive unit 2 be at a relatively high rate as this ensures that the temperature of the disk drive unit 2 is less sensitive to changes in air velocity or heat output of the disk drive unit 2. Furthermore, high air flow rates give good heat transfer rates to and from the disk drive unit 2.

An embodiment of the present invention has been described with particular reference to the examples illustrated. However, it will be appreciated that variations and modifications may be made to the examples described within the scope of the present invention.

What is claimed is:

1. A disk drive unit carrier for receiving a disk drive unit, the carrier being adapted to carry one and only one disk drive unit and comprising a temperature control device for controlling the temperature of a disk drive unit received in the carrier to be at a predetermined temperature, the disk drive unit carrier being arranged to be releasably mountable in an apparatus that can receive a plurality of such disk drive unit carriers whilst enabling independent temperature control of the disk drive unit received in the carrier relative to other disk drive units received in other carriers mounted in the apparatus.

2. A carrier according to claim 1, wherein the temperature control device comprises an air flow control device for causing air to flow across a disk drive unit received in the carrier.

3. A carrier according to claim 2, and comprising a heat exchanger for selectively receiving and cooling at least a portion of the air that has passed over a disk drive unit received in the carrier thereby to provide chilled air, wherein the air flow control device is selectively operable to cause air to recirculate directly across a disk drive unit received in the carrier, or to cause at least a portion of the air that has passed over a disk drive unit received in the carrier to pass through the heat exchanger to provide chilled air and to cause said chilled air to flow across a disk drive unit received in the carrier, or to cause a mixture of directly recirculated air and chilled air to flow across a disk drive unit received in the carrier.

4. A carrier according to claim 3, wherein the air flow control device comprises a baffle which is selectively movable.

5. A carrier according to claim 4, comprising a servo control for controlling movement of the baffle.

6. A carrier according to claim 2, wherein the air flow control device is selectively operable to cause air to recirculate across a disk drive unit received in the carrier, or to cause fresh air from outside the carrier to flow across a disk drive unit received in the carrier, or to cause a mixture of recirculated air and fresh air from outside the carrier to flow across a disk drive unit received in the carrier.

7. A carrier according to claim 6, wherein the air flow control device comprises a baffle which is selectively movable.

8. A carrier according to claim 7, comprising a servo control for controlling movement of the baffle.

9. A carrier according to claim 6, comprising a selectively operable heater in the air flow path to a disk drive unit received in the carrier for selectively heating air prior to said air flowing across a disk drive unit received in the carrier.

10. A carrier according to claim 2, comprising a selectively operable heater in the air flow path to a disk drive unit received in the carrier for selectively heating air prior to said air flowing across a disk drive unit received in the carrier.

11. A carrier according to claim 3, comprising a selectively operable heater in the air flow path to a disk drive unit received in the carrier for selectively heating air prior to said air flowing across a disk drive unit received in the carrier.

12. A carrier according to claim 1, wherein the disk drive unit carrier is a disk drive unit test carrier for receiving a disk drive unit during testing of the disk drive unit.

13. Data storage apparatus, the apparatus comprising a plurality of carriers according to claim 1 each for receiving a respective disk drive unit to allow the temperature of the respective disk drive units to be independently controlled during operation of the disk drive units.

14. Disk drive unit test apparatus for receiving a plurality of disk drive units, the test apparatus comprising a plurality of carriers according to claim 1 each for receiving a respective disk drive unit to allow the temperature of the respective disk drive units to be independently controlled during testing of the disk drive units.

15. Apparatus according to claim 14, comprising a controller for independent control of the temperature control devices of the disk drive unit carriers.

16. A method of testing a plurality of disk drive units, wherein the plurality of disk drive units are positioned within a single disk drive test apparatus, and the temperature of each of the disk drive units is independently controlled during testing of the disk drive units.

17. A method according to claim 16, comprising the step of controlling a flow of air across each of the disk drive units independently thereby to independently control the temperature of each of the disk drive units.

18. A method according to claim 17, comprising the step of, independently for each disk drive unit, controlling the flow of air across the disk drive unit to cause air to recirculate directly across the disk drive unit, or to cause chilled air obtained by passing at least a portion of the air that has passed over the disk drive unit through a heat exchanger to flow across the disk drive unit, or to cause a mixture of directly recirculating air and chilled air to flow across the disk drive unit.

19. A method according to claim 17, comprising the step of, independently for each disk drive unit, controlling the flow of air across the disk drive unit to cause air to recirculate across the disk drive unit, or to cause fresh air to flow across the disk drive unit, or to cause a mixture of recirculated air and fresh air to flow across the disk drive unit.

20. A method of operating a plurality of disk drive units, wherein each of the disk drive units is received in a disk drive unit carrier, the disk drive unit carriers are releasably mounted in a single data storage apparatus that can receive a plurality of such disk drive unit carriers, and the temperature of each of the disk drive units is independently controlled during operation of the disk drive units.

21. A method according to claim 20, comprising the step of controlling a flow of air across each of the disk drive units independently thereby to independently control the temperature of each of the disk drive units.

22. A method according to claim 21, comprising the step of, independently for each disk drive unit, controlling the flow of air across the disk drive unit to cause air to recirculate directly across the disk drive unit, or to cause chilled air obtained by passing at least a portion of the air that has passed over the disk drive unit through a heat exchanger to flow across the disk drive unit, or to cause a mixture of directly recirculating air and chilled air to flow across the disk drive unit.

23. A method according to claim 21, comprising the step of, independently for each disk drive unit, controlling the flow of air across the disk drive unit to cause air to recirculate across the disk drive unit, or to cause fresh air to flow across the disk drive unit, or to cause a mixture of recirculated air and fresh air to flow across the disk drive unit.

24. An apparatus that can receive a plurality of releasably mountable disk drive unit carriers, at least one of said disk drive unit carriers being adapted to carry only one disk drive unit and comprising a temperature control device for enabling independent temperature control of the disk drive unit received therein relative to other disk drive units received in other carriers mounted in the apparatus.

* * * * *

(12) EX PARTE REEXAMINATION CERTIFICATE (7831st)
United States Patent
Muncaster et al.

(10) Number: US 6,826,046 C1
(45) Certificate Issued: Oct. 26, 2010

(54) DISK DRIVE UNIT

(75) Inventors: Timothy J. Muncaster, Ryde (GB);
William A. Saville, Wickham (GB)

(73) Assignee: HSBC Bank PLC, London (GB)

Reexamination Request:
No. 90/010,592, Jul. 6, 2009

Reexamination Certificate for:
Patent No.: 6,826,046
Issued: Nov. 30, 2004
Appl. No.: 10/148,331
Filed: Sep. 20, 2002

(22) PCT Filed: Nov. 23, 2000
(86) PCT No.: PCT/GB00/04466
§ 371 (c)(1),
(2), (4) Date: Sep. 20, 2002
(87) PCT Pub. No.: WO01/41148
PCT Pub. Date: Jun. 7, 2001

(51) Int. Cl.
*G11B 33/14* (2006.01)

(52) U.S. Cl. ............. 361/679.33; 324/73.1; 361/679.51; 361/697; 474/184

(58) Field of Classification Search ................. None
See application file for complete search history.

(56) References Cited

U.S. PATENT DOCUMENTS

| | | |
|---|---|---|
| 3,360,032 A | 12/1967 | Sherwood |
| 4,379,259 A | 4/1983 | Varadi et al. |
| 4,881,591 A | 11/1989 | Rignall |
| 4,888,549 A | 12/1989 | Wilson et al. |
| 5,012,187 A | 4/1991 | Littlebury |
| 5,126,656 A | 6/1992 | Jones |
| 5,315,240 A | 5/1994 | Jones |
| 5,477,139 A | 12/1995 | West et al. |
| 5,761,032 A | 6/1998 | Jones |
| 5,831,525 A | 11/1998 | Harvey |
| 5,999,365 A | 12/1999 | Hasagawa et al. |
| 6,204,679 B1 | 3/2001 | Gray, III |
| 6,434,498 B1 | 8/2002 | Ulrich et al. |
| 6,434,499 B1 | 8/2002 | Ulrich et al. |
| 6,557,128 B1 | 4/2003 | Turnquist |
| 6,681,351 B1 | 1/2004 | Kittross et al. |
| 6,966,019 B2 | 11/2005 | Vien et al. |

FOREIGN PATENT DOCUMENTS

| | | | | |
|---|---|---|---|---|
| EP | 0356977 A2 | * | 3/1990 |
| EP | 0635836 A2 | * | 1/1995 |
| GB | 2347482 A | * | 9/2000 |
| JP | 7-37376 A | * | 2/1995 |
| JP | 2862679 B2 | * | 3/1999 |

OTHER PUBLICATIONS

Vena Engineering Corp. Vena Systems Documentation, Sep. 1999, VENA0001–VENA0006, T00099348–T00099358.
Tom Couglin et al., "The Disk Drive 50 Years of Progress and Technology Innovation," Apr. 1, 2004.
HighBeam Research, "Credence Announces Production Release of the EPRO AQ Series for Integrated Test and Back–Processing," Oct. 23, 1995.
HighBeam Research, "Asynchronous Testing Increased Throughput," Dec. 1, 2000.
International Business Machines, Inc., "IBM CSO Tester Images," 1990.

(Continued)

*Primary Examiner*—James Menefee (57) ABSTRACT

A disk drive unit carrier (1) is adapted to carry a single disk drive unit (2). The carrier (1) includes a temperature control device (4) for controlling the temperature of the disk drive unit (2). The temperature control device (4) is preferably in the form of an air flow control device (5,6) for controlling the flow of air across the disk drive unit (2) appropriately according to the required temperature for the disk drive unit (2).

OTHER PUBLICATIONS

HighBeam Research, "Test Multiple Parts at Once for Leaks. (Brief Article)," Nov. 1, 1999.
U.S. Provisional Appl. No. 60/146,988 to Wanek et al., filed Aug. 3, 1999.*
U.S. Provisional Appl. No. 60/158,280 to Wanek et al., filed Oct. 7, 1999.*
U.S. Provisional Appl. No. 60/170,939 to Wanek et al., filed Dec. 15, 1999.*
U.S. Provisional Appl. No. 60/090,932 to Ulrich et al., filed Jun. 26, 1998*
U.S. Provisional Appl. No. 60.146,812 to Wanek et al., filed Aug. 2, 1999.*

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1, 12, 14-17, 20, 21, and 24 is confirmed.

New claims 25-29 are added and determined to be patentable.

Claims 2-11, 13, 18, 19, 22, 23 were not reexamined.

*25. The apparatus according to claim 24, further comprising a heat exchanger to cause chilled air, obtained by passing at least a portion of air that has passed over one of said disk drive units, to flow across said disk drive unit.*

*26. The carrier according to claim 1, wherein the temperature of the disk drive unit can be controlled to be within ±1° C. in the range of ambient +3° C. to 70° C.*

*27. The method according to claim 16, wherein the temperature of the disk drive units can be controlled to be within ±1° C. in the range of ambient +3° C. to 70° C.*

*28. The method according to claim 20, wherein the temperature of the disk drive units can be controlled to be within ±1° C. in the range of ambient +3° C. to 70° C.*

*29. The apparatus according to claim 24, wherein the temperature of the disk drive unit can be controlled to be within ±1° C. in the range of ambient +3° C. to 70° C.*

\* \* \* \* \*